(12) United States Patent
Zhao et al.

(10) Patent No.: US 9,710,321 B2
(45) Date of Patent: Jul. 18, 2017

(54) ATYPICAL REBOOT DATA COLLECTION AND ANALYSIS

(71) Applicant: Microsoft Technology Licensing, LLC, Redmond, WA (US)

(72) Inventors: Pengxiang Zhao, Bellevue, WA (US); Robert Yu Zhu, Bellevue, WA (US); Ying Nor Chin, Bellevue, WA (US); Dejun Zhang, Bellevue, WA (US); Sailesh Baidya, Redmond, WA (US); Satyendra Bahadur, Yarrow Point, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

(21) Appl. No.: 14/747,015

(22) Filed: Jun. 23, 2015

(65) Prior Publication Data

US 2016/0378579 A1    Dec. 29, 2016

(51) Int. Cl.
*G06F 11/07*    (2006.01)
(52) U.S. Cl.
CPC ........ *G06F 11/079* (2013.01); *G06F 11/0751* (2013.01); *G06F 11/0778* (2013.01)
(58) Field of Classification Search
CPC .................................................. G06F 11/0778
USPC .................................................. 714/38.11, 45
See application file for complete search history.

(56) References Cited

U.S. PATENT DOCUMENTS

| | | | |
|---|---|---|---|
| 6,170,067 B1 * | 1/2001 | Liu et al. ................. | G06F 1/26 714/48 |
| 6,230,286 B1 | 5/2001 | Shapiro et al. | |
| 6,681,348 B1 * | 1/2004 | Vachon ............... | G06F 11/0778 714/45 |
| 6,728,907 B1 * | 4/2004 | Wang et al. .......... | G06F 11/073 714/47.1 |
| 7,356,733 B2 | 4/2008 | Michaelis et al. | |
| 7,398,430 B2 | 7/2008 | Wang et al. | |
| 7,594,144 B2 | 9/2009 | Brandyberry et al. | |

(Continued)

FOREIGN PATENT DOCUMENTS

| | | |
|---|---|---|
| CN | 100344204 | 10/2007 |
| CN | 101430658 | 5/2009 |

OTHER PUBLICATIONS

"HP ProLiant Servers—Integrated Management Log Event Error Messages", Retrieved From: <http://h20565.www2.hp.com/hpsc/doc.public/display?sp4ts.oid=3741097&docId=emr_na-c01742395> May 12, 2015, 5 pages.

(Continued)

*Primary Examiner* — Chae Ko

(57) ABSTRACT

A crash dump system in a device includes firmware that determines when an atypical reboot of the device is about to occur and both sets a flag indicating there was an atypical reboot and stores in nonvolatile memory crash dump data based on the type of event that caused the atypical reboot. The crash dump data includes a reboot code indicating the type of event that was detected. When the device is subsequently restarted due to the reboot, the operating system detects that the flag was set, and in response to the flag being set collects and analyzes the crash dump data from the reserved memory. Crash analysis data is generated based on this analysis and sent is to a remote service for possible further action (e.g., analysis, notification of a developer, and so forth).

20 Claims, 6 Drawing Sheets

(56) References Cited

U.S. PATENT DOCUMENTS

| | | | |
|---|---|---|---|
| 7,930,594 B2 | 4/2011 | Kitamorn et al. | |
| 8,046,631 B2 | 10/2011 | Jibbe et al. | |
| 8,132,057 B2 | 3/2012 | Jann et al. | |
| 8,219,077 B2 | 7/2012 | Cassett et al. | |
| 8,549,512 B1 | 10/2013 | Vannatter et al. | |
| 8,621,282 B1 | 12/2013 | Mixter et al. | |
| 8,650,445 B2 | 2/2014 | Gokhale et al. | |
| 8,719,642 B2 | 5/2014 | Laor | |
| 8,839,032 B2 | 9/2014 | Walton et al. | |
| 2004/0025093 A1* | 2/2004 | Willy et al. | G06F 11/3676 714/54 |
| 2004/0054989 A1* | 3/2004 | Harres | G06F 11/079 717/124 |
| 2005/0204199 A1 | 9/2005 | Harper et al. | |
| 2006/0041739 A1* | 2/2006 | Iwakura et al. | G06F 11/073 713/2 |
| 2006/0136877 A1* | 6/2006 | Gdaniec et al. | G06F 11/3476 717/127 |
| 2006/0168439 A1* | 7/2006 | Oguma | G06F 9/4406 713/2 |
| 2008/0133968 A1* | 6/2008 | Muppirala | G06F 11/0778 714/13 |
| 2008/0201616 A1* | 8/2008 | Ashmore | G06F 11/0727 714/57 |
| 2008/0313507 A1* | 12/2008 | Mahmud | G06F 11/008 714/49 |
| 2011/0035618 A1* | 2/2011 | Jann | G06F 11/0712 714/3 |
| 2012/0102370 A1* | 4/2012 | Yoshida et al. | G06F 11/0778 714/48 |
| 2013/0346369 A1* | 12/2013 | Kondou et al. | G06F 11/1458 707/642 |
| 2014/0149799 A1* | 5/2014 | Buendgen et al. | G06F 11/0778 714/38.11 |
| 2014/0196040 A1 | 7/2014 | Nicholas et al. | |
| 2015/0026377 A1 | 1/2015 | Tsai | |
| 2015/0234869 A1* | 8/2015 | Chan et al. | G06F 17/30312 |

OTHER PUBLICATIONS

"Unified Extensible Firmware Interface Specification", Version 2.5, Retrieved at: http://www.uefi.org/sites/default/files/resources/UEFI%202_5.pdf, Apr. 2015, 2637 pages.

Cinque, "Automatic Collection of Failure Data from the iOS Platform", In Proceedings of 43rd Annual IEEE/IFIP Conference on Dependable Systems and Networks Workshop, Jun. 24, 2013, 8 pages.

Cinque, "How do Mobile Phones Fail? A Failure Data Analysis of Symbian OS Smart Phones", In Proceedings of 37th Annual IEEE/IFIP International Conference on Dependable Systems and Networks, Jun. 25, 2007, 10 pages.

Middlecamp, "Proposal Store Last Reset Reason / Error Code / Debugging info on Reset, send to Cloud on Reconnect?", Retrieved From: <https://github.com/spark/firmware/issues/403> May 7, 2015, Mar. 8, 2015, 3 pages.

Willison, "Windows Failed Processes", Retrieved From: >https://www.tenable.com/sc-dashboards/windows-failed-processes≤ May 12, 2015, Feb. 19, 2015, 5 pages.

Yang, "Symbian OS System Event Log and Postmortem Software Fault Analysis", In Proceedings: Computer Science Masters of Science Thesis, University of Tampere Available at: >https://tampub.uta.fi/bitstream/handle/10024/80237/gradu03279.pdf?sequence=1>, Jun. 2008, 62 pages.

\* cited by examiner

ATYPICAL REBOOT DATA COLLECTION AND ANALYSIS

BACKGROUND

As computing technology has advanced, the capabilities of computers and the programs they are able to run have also advanced. This has led to an increase in computer functionality that is available to users. While users may enjoy this increase in functionality, it is not without its problems. One such problem is that the increased computer capabilities and program complexity can lead to unintended results (e.g., due to bugs) when running programs on these computers. The complexity of the computers and programs being run make it difficult to identify the cause of such unintended results and thus make it difficult to prevent them from being repeated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a computing device an event that causes the computing device to be atypically rebooted is detected, the event being one of multiple events that can cause the computing device to be atypically rebooted. Based on the event, which crash dump data to record is determined, and the determined crash dump data is written to reserved memory. The computing device is rebooted and, based on the event and the crash dump data, crash analysis data to send to a remote service is determined and communicated to the remote service.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
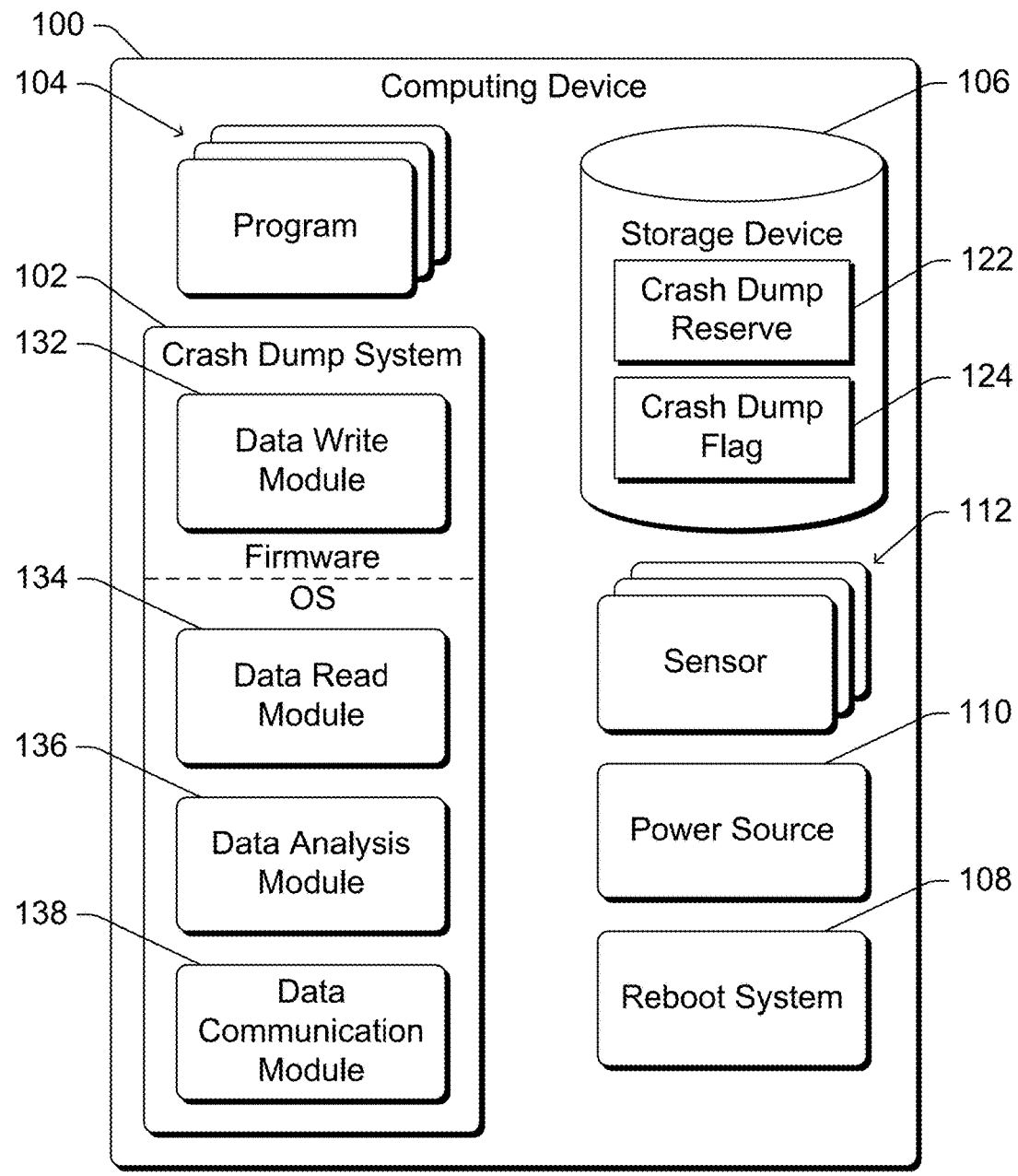
FIG. 1 is a block diagram illustrating an example computing device implementing the atypical reboot data collection and analysis in accordance with one or more embodiments.

Atypical reboot data collection and analysis is discussed herein. In many computing devices, situations can arise in which the computing device is atypically rebooted. An atypical reboot refers to a rebooting of the device due to an event other than the typical shut-down or reset sequence used by the operating system of the device (e.g., user selection of a "shut-down" or "reset" operating system menu option). Such events can be the detection of a malfunction in the computing device, a particular user input (e.g., selection of a particular combination of buttons on the device), and so forth. Malfunctions can occur in the computing device for various different reasons, such as the device overheating, the operating system hanging, and so forth. The firmware of the device detects such an event and reboots the computing device. In these situations the operating system is not in control of identifying the event causing the rebooting or initiating the rebooting, and thus is not able to generate (and/or has insufficient time to generate) a crash dump file storing memory contents and/or other system state for later evaluation. The techniques discussed herein, however, allow for the storage of crash dump data by the firmware. Thus, crash dump data regarding these atypical reboots is made available using the techniques discussed herein.

The techniques discussed herein, when a computing device initially successfully boots, reserve memory in the computing device for crash dump data. This memory is on a storage device of the computing device, and is used by the firmware only to store crash dump data. When an atypical reboot occurs, the event causing the atypical reboot is detected and the firmware sets a flag in the reserved memory indicating that there was an atypical reboot of the computing device (e.g., the computing device crashed) and that crash dump data may be available. The firmware also writes crash dump data to the reserved memory, such as a reboot code indicating the type of event that was detected, optionally additional register or memory values, and so forth. When the device resumes operation after rebooting, the operating system detects that the flag was set, and in response to the flag being set collects and analyzes the crash dump data from the reserved memory. Crash analysis data is generated based on this analysis and is sent to a remote service for possible further action (e.g., analysis, notification of a developer, and so forth). The crash dump data and crash analysis data are, individually or collectively, also referred to as atypical reboot data.

The techniques discussed herein provide a variety of different effects. By saving crash dump data for atypical reboots, the crash dump data can be evaluated and used by developers to better determine why the atypical reboots occurred and correct issues with the devices to reduce the number of atypical reboots that occur and improve the reliability of the devices. Furthermore, by analyzing the crash dump data at the device and determining what data to send to the remote service based on this analysis, the amount of bandwidth consumed in sending the data to the remote service can be reduced because all of the crash dump data need not be sent to the remote service.

FIG. 1 is a block diagram illustrating an example computing device 100 implementing the atypical reboot data collection and analysis in accordance with one or more embodiments. The computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device 100 may range from a full resource device with substantial memory and processor resources (e.g., personal computers, game consoles) to a low-resource device with limited memory and/or processing resources (e.g., traditional set-top boxes, hand-held game consoles).

The computing device 100 includes a crash dump system 102, one or more programs 104, a storage device 106, a reboot system 108, a power source 110, and one or more sensors 112. The programs 104 can be any of a variety of different application programs, operating system programs, or combinations thereof that run on the computing device 100.

The storage device 106 is a nonvolatile memory or store that can be implemented in any of a variety of different manners, such as Flash memory, magnetic disk, and so forth. The storage device 106 includes a crash dump reserve portion 122, which is a part of the nonvolatile memory that is reserved by the crash dump system 102 for crash dump data saved prior to an atypical reboot. The storage device 106 also includes a crash dump flag 124, which is a part of the nonvolatile memory that is reserved by the crash dump system 102 for a flag indicating that an atypical reboot occurred. A module of the crash dump system 102 operating in firmware (e.g., the data write module 132 as discussed in more detail below) reserves the crash dump reserve portion 122 and the crash dump flag 124, and prohibits write access to the portion 122 and flag 124 by the operating system or other programs 104. Thus, the portion 122 and flag 124 are reserved or protected so that only modules of the crash dump system 102 operating in firmware can write to the portion 122 and flag 124.

The reboot system 108 detects atypical reboot events and automatically reboots the computing device 100 in response to detection of an atypical reboot event. Rebooting the computing device 100 refers to resetting the computing device (e.g., equivalent to a hardware reset). A variety of different atypical reboot events can be detected by the reboot system 108, and which atypical reboot events are detected by the reboot system 108 can vary by implementation and based on the desires of the designer of the computing device 100. These atypical reboot events can include, for example, the temperature of the computing device 100 satisfying (e.g., equaling and/or exceeding) a threshold temperate value), the temperature of the computing device 100 rising at a particular rate (e.g., equaling and/or exceeding a threshold temperature rate), a user input in the form of a particular key or button sequence being input to a keyboard or buttons of the computing device 100 (also referred to as a user initiated event), the operating system of the computing device 100 becoming nonresponsive, and so forth.

The power source 110 provides power to the various components of the computing device 100. In one or more embodiments, the power source 110 is one or more batteries, although different power sources can alternatively be used. Batteries can be implemented using any of a variety of different technologies, such as lithium ion batteries, lithium ion polymer batteries, nickel-metal hydride batteries, or other types of rechargeable or non-rechargeable batteries.

Various ones of the one or more sensors 112 can detect movement (e.g., rotation, motion, velocity, etc.) of the computing device 100, temperature of the computing device 100, and other characteristics of the computing device 100 or the environment in which the computing device 100 is situated. For example, the one or more sensors can include an accelerometer, a thermometer, and so forth.

The computing device 100 is intended for consumer use, and as such the computing device 100 is locked down so that various debugging capabilities that allow a developer of the computing device 100 to access memory and determine why the computing device 100 may malfunction and result in an atypical reboot are no longer available. However, the crash dump system 102 allows some data regarding malfunctions that cause an atypical reboot of the computing device 100 to be made available.

The crash dump system 102 includes a data write module 132, a data read module 134, a data analysis module 136, and a data communication module 138. The module 132 is implemented in firmware of the computing device 100, whereas the modules 134, 136, and 138 are implemented in the operating system of the computing device 100. The firmware of the computing device 100 refers to firmware included in the platform or integrated circuit chip(s) used as the processor or other controller of the computing device 100, bus structures of the computing device 100, and so forth. In one or more embodiments, the computing device 100 is implemented in part as a system on a chip (SoC) that includes many of the hardware components of the computing device 100 on a single integrated circuit. The SoC can include, for example, one or more processors or other controllers, a bus structure, firmware stored in a read only memory, wireless communication components (e.g., supporting various wireless communication formats such as Wi-Fi data, cellular or other wireless phone formats, etc.), and so forth. In such embodiments, the data write module 132, as well as the reboot system 108, are implemented in the firmware stored in the read only memory of the SoC.

The data write module 132 determines when atypical reboot events occur. In one or more embodiments, the data write module 132 determines when atypical reboot events occur by receiving from the reboot system 108 an indication of atypical reboot events detected by the reboot system 108. Additionally or alternatively, the data write module 132 can detect atypical reboot events itself in a manner analogous to that used by the reboot system 108 to detect atypical reboot events.

In response to determining that an atypical reboot event occurs, the data write module 132 sets the crash dump flag 124 (e.g., writes a value of 1 to the crash dump flag 124) to indicate that an atypical reboot occurred and crash dump data is expected to be stored in the crash dump reserve, and also writes various data regarding a current state of the computing device 100 to the crash dump reserve 122. Various different types of data can be written to the crash dump reserve 122, such as an indication of the type of event (e.g., a reboot code indicating why the computing device 100 was rebooted), data stored in various registers or other memory of the firmware of computing device 100, data stored in various other memory of the computing device 100, and so forth. The type of event can be determined by the data write module 132 and/or reboot system 108 as part of the process of detecting that the atypical reboot event occurred. The particular data that is stored in the crash dump reserve 122 can vary by implementation and based on the desires of the designer of the computing device 100.

Table I illustrates an example of types of events that can result in an atypical reboot in accordance with one or more embodiments. It should be noted that the types of events discussed in Table I are examples, and that in alternate embodiments additional types of events can also result in an atypical reboot and/or some of these events need not result in an atypical reboot.

TABLE I

| Event | Description |
| --- | --- |
| Non-secure watchdog bite | Non-secure watchdog is asserted by the resource power manager when the processor cores appear to be hung. |
| Secure watchdog bite | Secure watchdog is asserted when the resource power manager is hung while executing trust zone code. |
| Hardware thermal reset | Hardware thermal reset is generated when thermal thresholds are reached on the Soc. |
| User initiated reset | A user initiated hard reset (e.g., user input of a particular key combination). |
| Power loss | A loss of power from the power source. |
| RPM error | An error in the resource power manager (RPM). |
| RPM watchdog bite | RPM watchdog bite is asserted when the resource power manager core is hung and the resource power manager watchdog has expired. |
| Memory error | A memory error in the SoC of the computing device. |
| Network error | A network component error in the SoC of the computing device. |
| Processor violations | A processor (central processing unit (CPU) and/or graphics processing unit (GPU)) error in the SoC of the computing device. |

In some situations, the reboot system 108 reboots the computing device 100 very quickly in response to detecting a reboot event, in which case the data write module 132 may not have sufficient time to write all of the crash dump data that it desires to write to the crash dump reserve 122. However, there is typically enough time to write at least some data (e.g., at least a few bytes), and the data write module 132 writes as much of the crash dump data that it desires to write as it can to the crash dump reserve 122. In one or more embodiments, the data write module 132 prioritizes the crash dump data that it writes so that higher priority data is written to the crash dump reserve 122 prior to lower priority data. The higher priority data is data that is deemed to be more useful to a system or user analyzing the crash dump data than lower priority data. For example, a reboot code may be given highest priority, values stored in registers of the SoC may be given second highest priority, and data stored in other memory (e.g., random access memory) may be given the lowest priority.

Additionally, the data write module 132 can determine which data to write to the crash dump reserve 122 based on the reboot event. Some types of data may be more important than other types of data based on the reboot event, and any of a variety of different rules, criteria, or algorithms can be used to determine which data to write to the crash dump reserve 122. For example, data from one or more sensors 112 (e.g., an accelerometer) may be written to the crash dump reserve 122 if the reboot event is a loss of power, but not if the reboot event is a high temperature. Or, data regarding the state of one or more components of the computing device 100 (e.g., a modem or other component that is deemed likely to be a cause of high temperature in the computing device 100) may be written to the crash dump reserve 122 if the reboot event is a high temperature, but not if the reboot event is a loss of power.

By way of example, the reboot system 108 may determine that an atypical reboot is to be performed in response to the temperature of the computing device 100 exceeding a threshold value (as indicated by one of the sensors 112). The data write module 132 sets the crash dump flag 124 and an indication of the type of this atypical reboot event (high temperature) is written to the crash dump reserve 122. Additional data can optionally be written to the crash dump reserve by the data write module 132, although there may be insufficient time to write all of the desired data due to the desire of the reboot system 108 to reboot the computing device quickly due to the high temperature.

By way of example, the reboot system 108 may determine that an atypical reboot is to be performed in response to detection by reboot system 108 of a loss of power from the power source 110 (e.g., the battery is drained or pops out). In the event of a loss of power, there is typically enough power left in the capacitance of the circuitry of the computing device 100 for the data write module 132 to write at least some data (e.g., a few milliseconds so that at least a byte or two can be written) of data to the storage device 106. Accordingly, the data write module 132 sets the crash dump flag 124 and writes an indication of the type of this atypical reboot event (power loss) to the crash dump reserve 122. Additional data can optionally be written to the crash dump reserve by the data write module 132, although there may be insufficient time to write all of the desired data due to loss of power. For example, the data write module 132 may attempt to write data indicating a state of one or more of the sensors 112 (e.g., an accelerometer) that could be used during subsequent analysis to determine whether the computing device 100 was dropped.

By way of example, the reboot system 108 may determine that an atypical reboot is to be performed in response to the reboot system 108 detecting that the operating system of the computing device 100 has become nonresponsive. The data write module 132 sets the crash dump flag 124 and an indication of the type of this atypical reboot event (nonresponsive operating system) is written to the crash dump reserve 122. Additional data can optionally be written to the crash dump reserve by the data write module 132, and there is typically sufficient time to write all of the desired data due to the firmware of the computing device 100 writing the data rather than the operating system (which is nonresponsive).

The data write module 132 writes crash dump data to the crash dump reserve 122 and sets the crash dump flag 124 in response to the atypical reboot event being detected but prior to the atypical reboot actually occurring. After the atypical reboot occurs, as part of restarting the computing device 100 the data read module 134, the data analysis module 136, and the data communication module 138 operate to read, analyze, and communicate information regarding the atypical reboot to a remote service.

As part of restarting the computing device 100 after the atypical reboot, a module of the crash dump system 102 (e.g., the data read module 134) checks whether the crash dump flag 124 has been set. If the crash dump flag 124 has been set, then the crash dump system 102 proceeds to read, analyze, and communicate information regarding the atypical reboot to a remote service. However, if the crash dump flag 124 has not been set (is cleared), then the crash dump system 102 does not perform any such reading, analyzing, or communicating because the restarting of the computing device 100 is not a result of an atypical reboot.

The data read module 134 reads the crash dump data from the crash dump reserve 122 and provides the crash dump data to the data analysis module 136. The data read module 134 optionally writes the crash dump data to a portion of the storage device 106 separate from the crash dump reserve 122, such as a new file of the storage device 106, to make the crash dump reserve 122 available for storage of new crash dump data in the event of another atypical reboot of the computing device 100. This portion of the stored device 106 that is separate from the crash dump reserve 122 may also be referred to as a live dump portion.

It should be noted that the crash dump reserve 122, as well as the separate portion of the storage device 106 to which the data read module 134 may write the crash dump data, can be used without further rebooting of the computing device 100. In contrast to systems in which the crash dump system 102 may not be trusted to be operating correctly (and thus able to correctly save data in the crash dump reserve 122 or write the crash dump data to a separate portion of the storage device 106), the crash dump data was written to the crash dump reserve 122 by the data write module 132 in the firmware prior to the reboot, and then the computing device 100 was rebooted. As such, the computing device 100 (including the operating system) has already been rebooted, and the data read module 134 can be trusted to be operating correctly and thus correctly write the crash dump data to a separate portion of the storage device 106. The crash dump system 102 can thus also be referred to as supporting a single reboot scenario for the computing device 100 because only the single reboot (the atypical reboot) is performed, and a second reboot is not needed to obtain the crash dump data.

The data analysis module 136 analyzes the crash dump data read from the crash dump reserve 122 and generates crash analysis data based on the crash dump data. The data analysis module 136 can apply any of a variety of different rules, criteria, algorithms, and so forth to the crash dump data in order to generate the crash analysis data. Although the crash analysis data can optionally include all of the crash dump data, the crash analysis data is typically smaller in size than the crash dump data. The manner in which the analysis is performed can vary by implementation and the desires of the designer of the crash dump system 102. In one or more embodiments, based on the reboot code in the crash dump data, the crash analysis data includes only an indication of the type of the reboot. For example, if the type of the atypical reboot is a power failure, then the crash analysis data can include only an indication that the type of the atypical reboot is a power failure (e.g., it can be assumed that there is nothing malfunctioning in the computing device 100 if the power is lost due to a drained or popped out battery).

The data communication module 138 obtains the crash analysis data from the data analysis module 136 and communicates to the crash analysis data to a remote service. Due to the smaller size of the crash analysis data relative to the crash dump data, data bandwidth of the computing device 100 is reduced by sending the crash analysis data rather than the crash dump data to the remote service. The remote service can then take a variety of different actions based on the crash analysis data, such as further analysis of the crash analysis data, notification of a developer or designer of the computing device 100 of the crash analysis data, and so forth.

In one or more embodiments, the data read module 134 maintains a separate record of the crash dump data on the storage device 106 (e.g., the live dump portion). The remote service can optionally request a copy of the crash dump data, and in response to such a request the data communication module 138 communicates the crash dump data to the remote service.

Additionally, at some point the crash dump flag 124 is cleared (e.g., a value of 0 is written to the crash dump flag 124) by the crash dump system 102. The crash dump flag 124 can be cleared at various times, such as after the crash dump data is read by the data read module 134, after crash analysis data is sent to the remote service by the data communication module 138, after the crash dump data is written to a separate portion of the storage device 106, and so forth.

Figure 2:
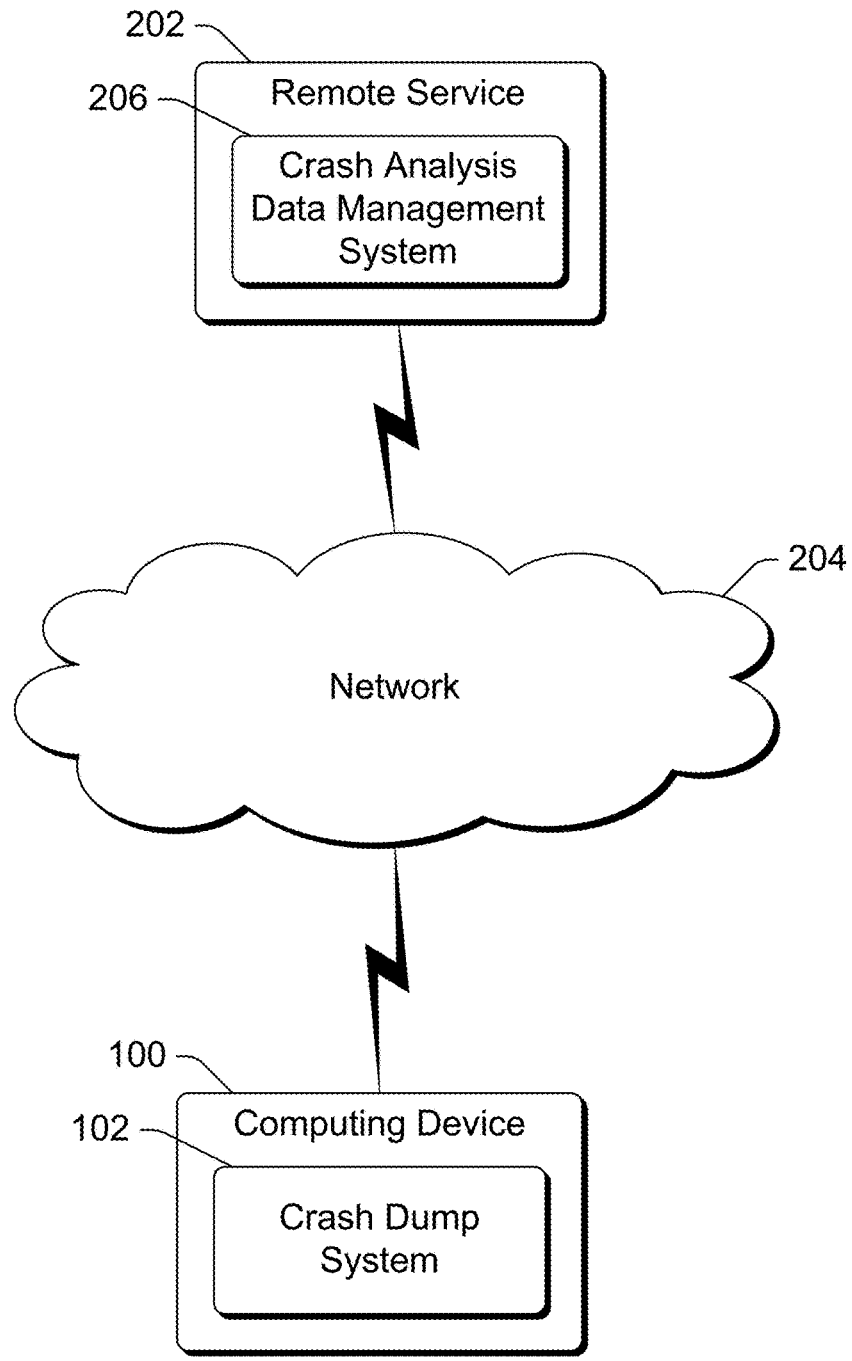
FIG. 2 illustrates an example system implementing the atypical reboot data collection and analysis in accordance with one or more embodiments.

FIG. 2 illustrates an example system 200 implementing the atypical reboot data collection and analysis in accordance with one or more embodiments. The system 200 includes the computing device 100 that can communicate with a remote service 202 via a network 204. The network 204 can be a variety of different networks, including the Internet, a local area network (LAN), a phone network, an intranet, other public and/or proprietary networks, combinations thereof, and so forth.

The remote service 202 is implemented using one or more computing devices that are of the same or different types. Similar to the discussion of computing device 102, the remote service 202 can be implemented using can any of a variety of different types of computing devices, ranging from full resource devices with substantial memory and processor resources to low-resource devices with limited memory and/or processing resources.

The remote service 202 includes a crash analysis data management system 206 that receives the crash analysis data from the crash dump system 102 of the computing device 100. Although a single computing device 100 is illustrated in system 200, it should be noted that the remote service 202 can receive crash analysis data from multiple computing devices analogous to the computing device 100. The crash analysis data management system 206 can perform various actions based on the received crash analysis data, such as further analysis of the crash analysis data, notification of device developers or designers of the crash analysis data, and so forth.

In one more embodiments, the communicating of crash analysis data or crash dump data to the remote service 202 is performed only after receiving consent of the user of the computing device 100 to do so. This user consent can be an opt-in consent, where the user takes an affirmative action to request that the data be communicated before user the crash dump system 102 communicates any crash analysis data or crash dump data to the remote service 202. Alternatively, this user consent can be an opt-out consent, where the user takes an affirmative action to request that the crash analysis data or crash dump data not be communicated to the remote service 202. If the user does not choose to opt out of this communication of data, then it is an implied consent by the user to communicate the data to the remote service 202.

Figure 3:
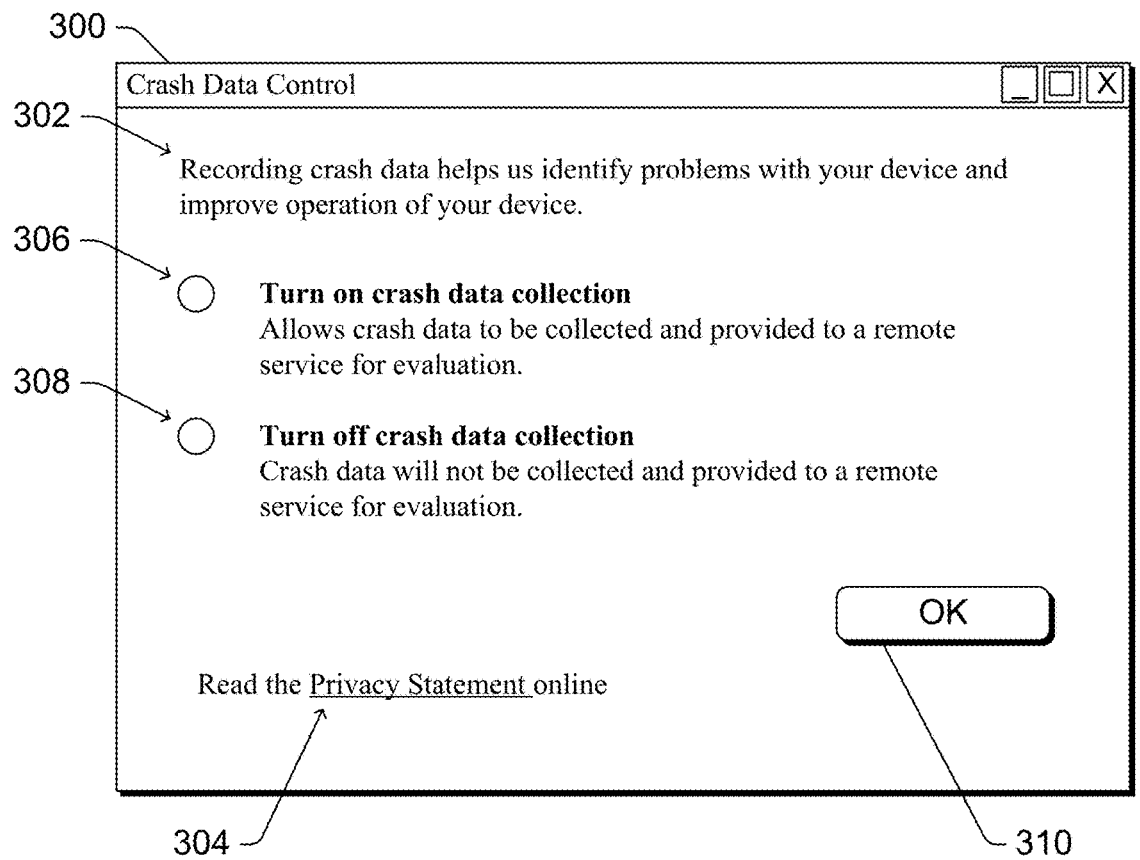
FIG. 3 illustrates an example user interface that can be displayed to a user to allow the user to select whether data will be communicated to a remote service in accordance with one or more embodiments.

FIG. 3 illustrates an example user interface that can be displayed to a user to allow the user to select whether data will be communicated to the remote service 202 in accordance with one or more embodiments. A crash data control window 300 is displayed including a description 302 explaining to the user why crash data is being communicated to the remote service. A link 304 to a privacy statement is also displayed. If the user selects link 304, a privacy statement of the remote service is displayed, explaining to the user how the data communicated to the remote service is kept confidential.

Additionally, the user is able to select a radio button 306 to opt-in to the communication of data to the remote service, or a radio button 308 to opt-out of the communication of data to the remote service. Once a radio button 306 or 308 is selected, the user can select an "OK" button 310 to have the selection saved. It is to be appreciated that radio buttons and an "OK" button are only examples of user interfaces that can be presented to a user to opt-in or opt-out of the communication of data to the remote service, and that a variety of other conventional user interface techniques can alternatively be used. The crash dump system 102 then proceeds to communicate or not communicate data to the remote service in accordance with the user's selection.

Figure 4:
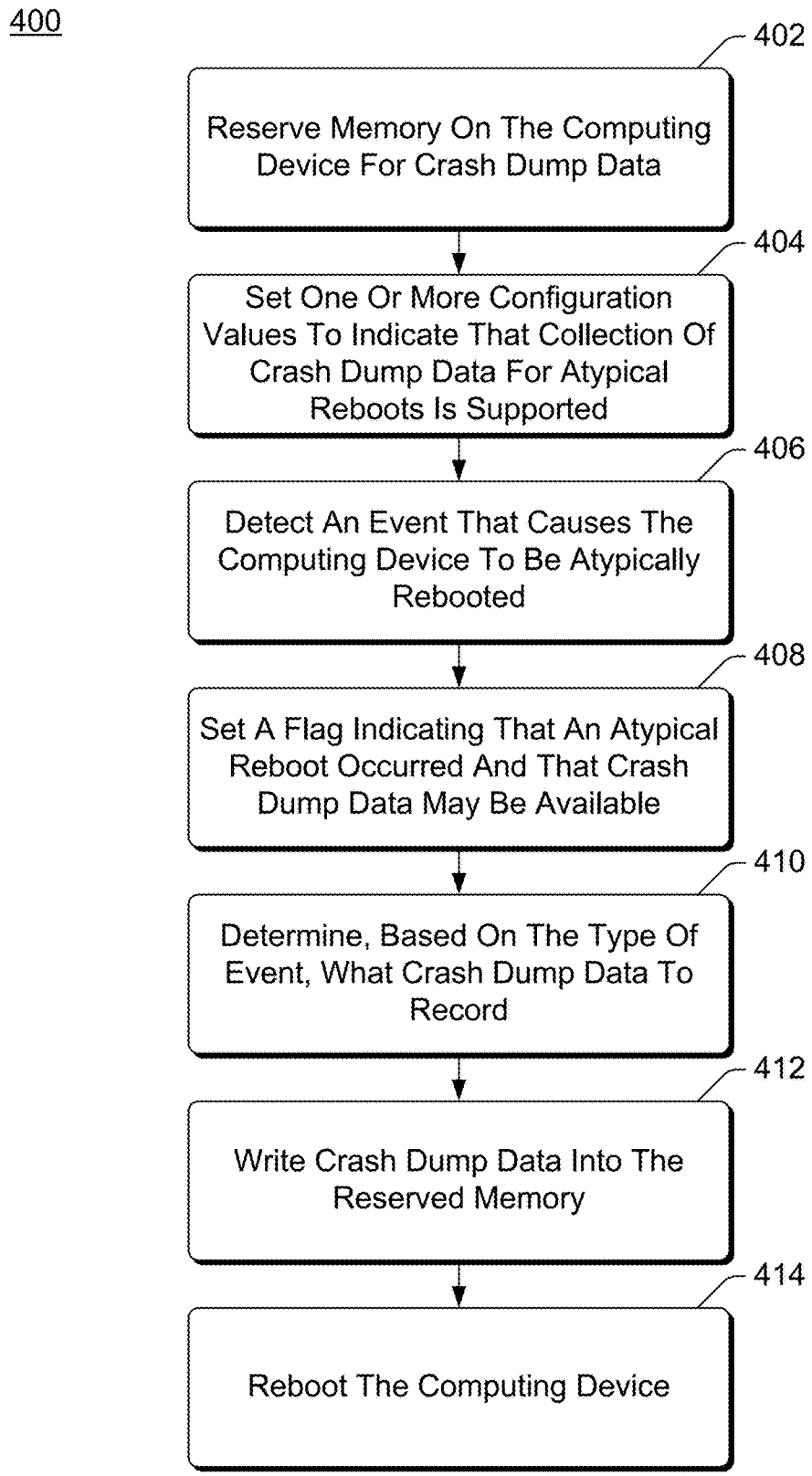
FIG. 4 is a flowchart illustrating an example process for collecting atypical reboot data in accordance with one or more embodiments.

FIG. 4 is a flowchart illustrating an example process 400 for collecting atypical reboot data in accordance with one or more embodiments. Process 400 is carried out in part by a crash dump system, such as the crash dump system 102 of FIG. 1 and FIG. 2. In one or more embodiments, process 400 is performed in firmware, although alternatively process 400 may be performed at least in part in hardware or software. Process 400 is shown as a set of acts and is not limited to the order shown for performing the operations of the various acts. Process 400 is an example process for collecting atypical reboot data; additional discussions of collecting atypical reboot data are included herein with reference to different figures.

In process 400, memory on the computing device is reserved for crash dump data (act 402). This reserved memory is a portion of nonvolatile memory on the computing device, and the computing device allows firmware of the computing device to write to the reserved memory but not the operating system or other programs running on the computing device. The reserved memory is, for example, the crash dump reserve 122 of FIG. 1.

One or more configuration values are optionally set to indicate that the collection of crash dump data for atypical reboots is supported or to be used (act 404). These configuration values are configuration values of various registers or other data structures used by the firmware and/or operating system of the computing device. The collection of crash dump data refers to the obtaining and writing of the crash dump data to the reserved memory. Alternatively, support for the collection of crash dump data for atypical reboots can be assumed, in which case act 404 need not be performed.

At some subsequent time, an event that causes the computing device to be atypically rebooted is detected (act 406). Multiple different events can cause the computing device to be atypically rebooted, and one of those multiple different events is detected in act 406.

A flag indicating that an atypical reboot occurred and that crash dump data may be available is set (act 408). Crash dump data is likely available if the flag is set, however, situations can arise in which no such crash dump data is available because the computing device lost power too quickly or was otherwise unable to write the crash dump data to the reserved memory.

A determination is made, based on the type of event, what crash dump data to record (act 410). Various different types of data may be recorded as crash dump data, such as firmware settings, operating system settings, memory contents, status of various hardware or other components of the computing device, and so forth. The crash dump system discussed herein is configured with various rules, criteria, algorithms, combinations thereof, and so forth so that the appropriate crash dump data that is deemed to be beneficial in analysis of the atypical reboot is determined in act 410.

The crash dump data determined in act 410 is written to the reserved memory (act 412). This crash dump data can be written in a prioritized manner as discussed above, and includes an indication of the type of the event that was detected in act 406. As discussed above, an attempt is made to write all of the crash dump data to the reserved memory, although situations can arise in which not all of the crash dump data can be written to the reserved memory (e.g., due to a loss in power).

The computing device is rebooted (act 414). It should be noted that the rebooting performed in act 414 can be implemented by a separate system or module than implements acts 406-412, and that the rebooting performed in act 414 can be, but need not be, done in response to the crash dump data being written into the reserved memory in act 412.

Figure 5:
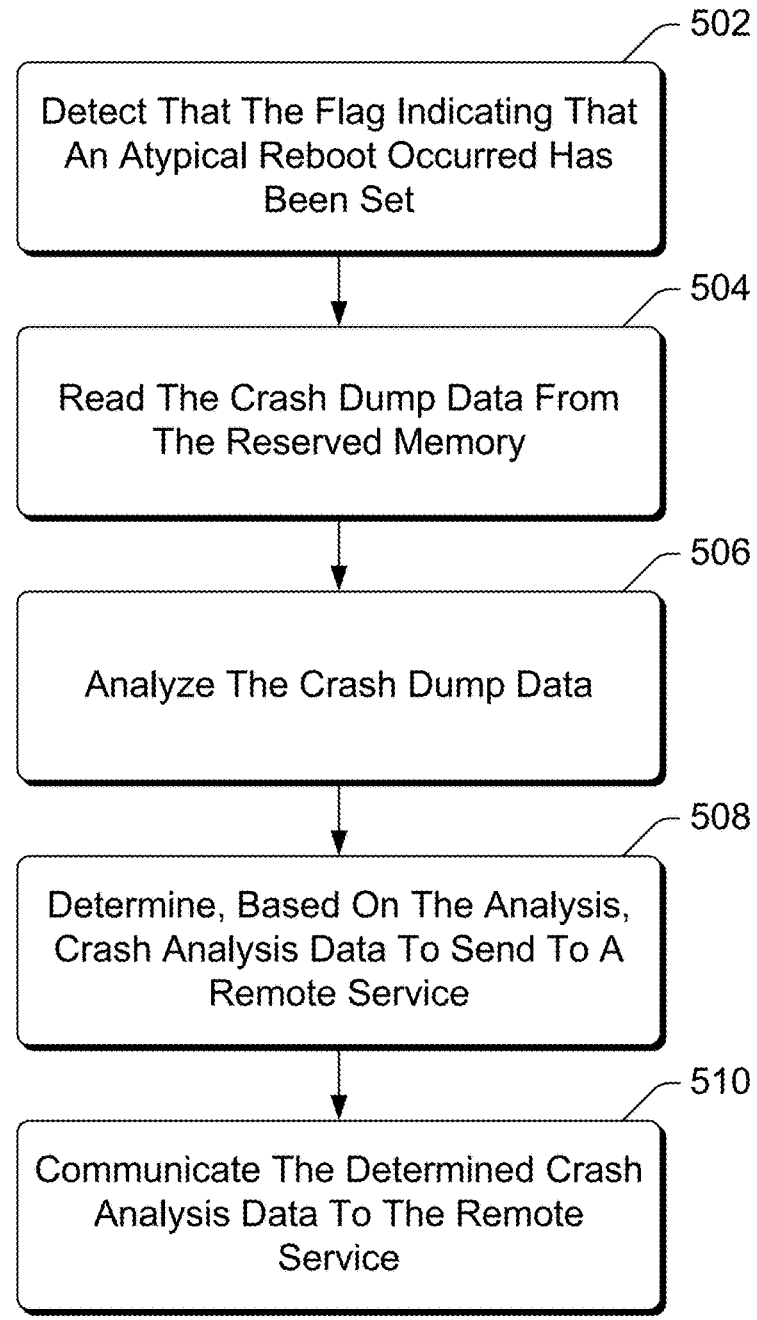
FIG. 5 is a flowchart illustrating an example process for using atypical reboot data in accordance with one or more embodiments.

FIG. 5 is a flowchart illustrating an example process 500 for using atypical reboot data in accordance with one or more embodiments. Process 500 is carried out by a crash dump system, such as the crash dump system 102 of FIG. 1 and FIG. 2. In one or more embodiments, process 500 is performed in software (e.g., by an operating system), although alternatively process 500 may be performed at least in part in hardware or firmware. Process 500 is shown as a set of acts and is not limited to the order shown for performing the operations of the various acts. Process 500 is an example process for using atypical reboot data; additional discussions of using atypical reboot data are included herein with reference to different figures.

In process 500, when restarting the computing device after an atypical reboot, the flag indicating that an atypical reboot occurred being set is detected (act 502).

In response to the set flag being detected, crash dump data is read from the reserved memory (act 504). The crash dump data can optionally be stored in a separate portion of the memory and the flag cleared, as discussed above.

The crash dump data is analyzed (act 506). The crash dump system discussed herein is configured with various rules, criteria, algorithms, combinations thereof, and so forth to analyze the crash dump data. For example, this analysis can be based on the type of the event that caused the atypical reboot as discussed above.

Based on the analysis in act 506, crash analysis data to send to a remote service is determined (act 508). This determined crash analysis data is communicated to the remote service (act 510). The analysis in act 506 determines which of the crash dump data is to be sent to the remote service and/or generates new data (based on the crash dump data) to be sent to the remote service. It should be noted that the crash analysis data is a smaller amount of data (is made up of a few number of bytes) than the crash dump data, so bandwidth to the remote service can be reduced by communicating the crash analysis data rather than the crash dump data to the remote service.

The following are examples of various different data structures that can be used to implement the techniques discussed herein. The following data structures are discussed with reference to the Unified Extensible Firmware Interface (UEFI) Specification, Version 2.5 (April 2015). However, it should be noted that the techniques discussed herein can be used with other data structures, and are not limited to use with the UEFI Specification. Furthermore, although specific information included in these data structures is discussed, it should be noted that additional information can optionally be added to these data structures and/or that some of the described information can be excluded from these data structures.

Table II illustrates an example offline crash dump configuration table in accordance with one or more embodiments. The offline crash dump configuration table is used to pass information from the firmware to the operating system, and can be read from and written to by the firmware, but cannot be written to by the operating system.

TABLE II

| Field | Description |
| --- | --- |
| Version | The version of this data structure definition. |
| Abnormal Reset Occurred | Whether an abnormal reset occurred (an atypical reboot) on the most recent system boot. |
| Offline Memory Dump Capable | A bitmask that describes the capability to create a dump of memory after a hard hang. |
| Reset Data Address | Physical address of a firmware allocated buffer containing a reset data header data structure (discussed below with reference to Table III). |
| Reset Data Size | Size (e.g., in bytes) of the reset data header data structure. |

The abnormal reset occurred field of Table II is a bitmask with a single bit being used to indicate with an atypical reboot occurred (this single bit being the flag value indicating whether an atypical reboot occurred). The firmware writes one value (e.g., 0) to the single bit to indicate that the most recent boot was normal, and a different value (e.g., 1) to the single bit to indicate that the most recent boot was an atypical reboot (was abnormal). The bitmask optionally includes various additional bits that are reserved for future use.

The offline memory dump capable field of Table II is a bitmask with a single bit being used to indicate whether the firmware of the computing device supports the atypical reboot data collection and analysis discussed herein. The firmware writes one value (e.g., 0) to the single bit to indicate that the atypical reboot data collection and analysis discussed herein is not supported, and a different value (e.g., 1) to the single bit to indicate that the atypical reboot data collection and analysis discussed herein is supported. The bitmask optionally includes various additional bits that are reserved for future use and/or are used to indicate other types of data collection and analysis supported by the firmware of the computing device.

An additional offline memory dump use capability data structure can also be used to allow the operating system to communicate to the firmware which type of data collection and analysis is to be used. The operating system queries the offline memory dump capable field of Table II to determine which types of data collection and analysis are supported by the firmware, and then sets a value in the offline memory dump use capability data structure to indicate which of those supported types is to be used by the firmware. The offline memory dump use capability data structure is a bitmask with each individual bit corresponding to one of the types of data collection and analysis (including one bit corresponding to the atypical reboot data collection and analysis discussed herein). The operating system writes one value (e.g., 0) to the single bit to indicate that the corresponding type of data collection and analysis not to be used, and a different value (e.g., 1) to the single bit to indicate that the corresponding type of data collection and analysis is to be used. The bitmask optionally includes various additional bits that are reserved for future use.

Table III illustrates an example reset data header table in accordance with one or more embodiments. The reset data header table describes a reset data header data structure that is a header for the firmware allocated buffer (the reserved memory, illustrated as the crash dump reserve 122 in FIG. 1), describing various aspects of the firmware allocated buffer.

TABLE III

| Field | Description |
| --- | --- |
| Version | The version of this reset data header data structure definition. |
| Platform ID | A platform identifier of the SoC on the computing device, used to distinguish between different SoCs and different operating systems. |
| Identifier | An identifier (e.g., a Globally Unique ID or GUID) of the firmware allocated buffer. This value is used to populate the reset data header data structure in the separate portion of the memory where the crash dump data is stored by the operating system, and the operating system can use this identifier to locate the crash dump data in that separate portion. |
| Data Size | Size (e.g., in bytes) of the reset data structure (discussed below with reference to Table IV). |

Table IV illustrates an example reset data table in accordance with one or more embodiments. The reset data table describes a reset data structure that is the firmware allocated buffer (the reserved memory, illustrated as the crash dump reserve 122 in FIG. 1).

TABLE IV

| Field | Description |
| --- | --- |
| Header | The reset data header data structure (discussed above with reference to Table III). |
| Data | The crash dump data. |

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
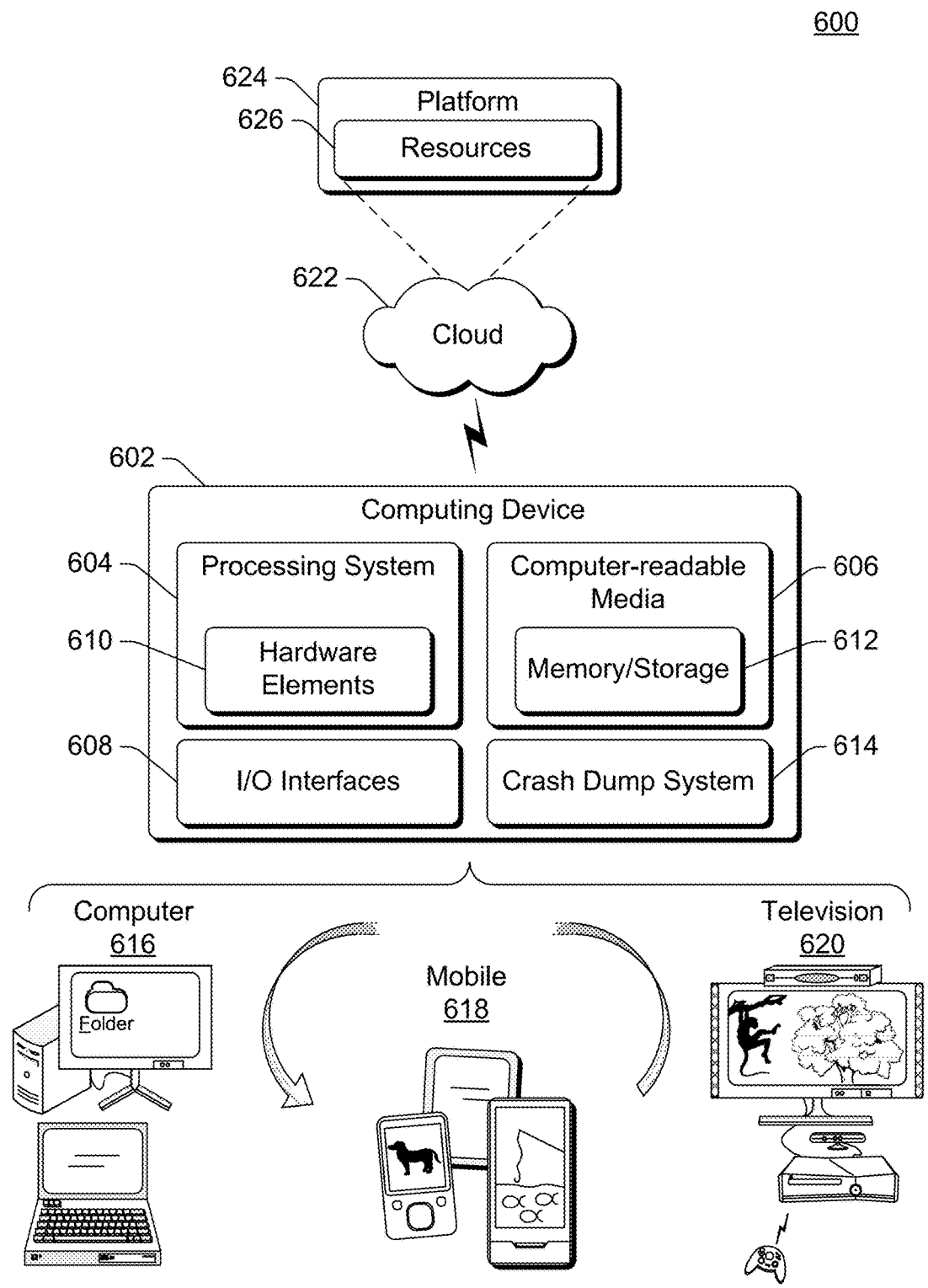
FIG. 6 illustrates an example system generally that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a smartphone, a wearable computer, a tablet computer, and/or any other suitable computing device or computing system. The computing device 602 can be, for example, the computing device 100 of FIG. 1 or FIG. 2.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a crash dump system 614. The crash dump system 614 provides various atypical reboot data collection, analysis, and communication as discussed above. The crash dump system 614 can implement, for example, the crash dump system 102 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: detecting an event that causes the computing device to be atypically rebooted, the event being one of multiple events that can cause the computing device to be atypically rebooted; determining, based on the event, which crash dump data to record; writing the determined crash dump data to reserved memory; rebooting the computing device; determining, based on the event and the crash dump data, crash analysis data to send to a remote service; and communicating the determined crash analysis data to the remote service, effective to allow reliability of the computing device to be improved by analysis of the crash analysis data.

Alternatively or in addition to any of the above described methods, any one or combination of: the event comprising a loss of power event, the determining which crash dump data to record comprising including in the crash dump data an indication that the type of event is the loss of power event, and the writing comprising writing the determined crash dump data to reserved memory despite loss of power in the computing device; the determining which crash dump data to record comprising including in the crash dump data status data from an accelerometer of the computing device; the event comprising a high temperature event, and the determining which crash dump data to record comprising including in the crash dump data an indication that the type of event is the high temperature event; the determining the crash analysis data comprising using as the crash analysis data only an indication of the type of the event; the crash analysis data comprising a fewer number of bytes than the crash dump data; the method further comprising setting, in the reserved memory prior to rebooting the computing device, a flag value indicating that the computing device has been atypically rebooted, detecting, after rebooting the computing device, that the flag value has been set, and performing the determining the crash analysis data and the communicating the determined crash analysis data in response to detecting that the flag value has been set; the method further comprising copying the crash dump data from the reserved memory to a separate portion of a storage device of the computing device, and clearing the flag value; the method further comprising receiving, after communicating the crash analysis data to the remote service, a request from the remote service for the crash dump data, and communicating, in response to the request, the crash dump data to the remote service; the event comprising a user initiated event; the computing device including a system on a chip having a processor executing firmware and running an operating system, the detecting the event, the determining which crash dump data to record, and the writing the determined crash dump being implemented in the firmware, and the determining the crash analysis data and the communicating the determined crash analysis data being implemented in the operating system.

A computing device comprising: nonvolatile memory; a system on a chip including a processor and firmware, the processor configured to execute the firmware as well as an operating system; a data write module, included as part of the firmware, configured to detect an event that causes the computing device to be atypically rebooted, the event being one of multiple events that can cause the computing device to be atypically rebooted, to determine, based on the event, which crash dump data to record, and to write the determined crash dump data to a reserved part of the nonvolatile memory; a reboot system, included as part of the firmware, configured to reboot the computing device in response to the event; a data analysis module, included as part of the operating system to determine, based on the event and the crash dump data, crash analysis data to send to a remote service; and a data communication module to communicate the determined crash analysis data to the remote service, effective to allow reliability of the computing device to be improved by analysis of the crash analysis data.

Alternatively or in addition to any of the above described computing devices, any one or combination of: the reserved part of the nonvolatile memory comprising a part of the nonvolatile memory to which the data write module can write crash dump data but other programs on the computing device cannot write data; the crash analysis data comprising a smaller amount of data than the crash dump data; the computing device further comprising the data write module being further configured to set, in the reserved memory prior to the computing device being rebooted by the reboot system, a flag value indicating that the computing device has been atypically rebooted, a data read module configured to detect, after rebooting the computing device, that the flag value has been set, and the data analysis module being configured to determine the crash analysis data and the data communication module being configured to communicate the determined crash analysis data to the remote service in response to the data read module detecting that the flag value has been set.

A computing device comprising: one or more processors; firmware including multiple instructions that, responsive to execution by the one or more processors, cause the one or more processors to: detect an event that causes the computing device to be atypically rebooted, determine, based on the event, which crash dump data to record, write the determined crash dump data to reserved memory, and reboot the computing device; and an operating system including multiple instructions that, responsive to execution by the one or more processors, cause the one or more processors to: determine, based on the event and the crash dump data, crash analysis data to send to a remote service, and communicate the determined crash analysis data to the remote service, effective to allow reliability of the computing device to be improved by analysis of the crash analysis data.

Alternatively or in addition to any of the above described computing devices, any one or combination of: the computing device including nonvolatile memory, the reserved memory comprising a part of the nonvolatile memory to which the firmware can write but the operating system cannot write data; the computing device further comprising the one or more processors, the reserved memory, and the firmware being implemented on a system on a chip of the computing device; the crash analysis data comprising a fewer number of bytes than the crash dump data; the computing device further comprising the firmware, responsive to execution by the one or more processors, further causing the one or more processors to set, in the reserved memory prior to the computing device being rebooted by the reboot system, a flag value indicating that the computing device has been atypically rebooted, and the operating system, responsive to execution by the one or more processors, further causing the one or more processors to detect, after rebooting the computing device, that the flag value has been set, and determine the crash analysis data and communicate the determined crash analysis data to the remote service in response to the detecting that the flag value has been set.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the computing device including a processor executing firmware and running an operating system, the method comprising:
   detecting, by the firmware, an event that causes the computing device to be atypically rebooted, the event being one of multiple events that can cause the computing device to be atypically rebooted;
   determining, by the firmware, based on the event, which crash dump data to record;
   writing, by the firmware, the determined crash dump data to reserved memory;
   rebooting the computing device;
   determining, by the operating system, based on the event and the crash dump data, crash analysis data to send to a remote service; and
   communicating, by the operating system, the determined crash analysis data to the remote service.

2. The method as recited in claim 1, the event comprising a loss of power event, the determining which crash dump data to record comprising including in the crash dump data an indication that the type of event is the loss of power event, and the writing comprising writing the determined crash dump data to reserved memory despite loss of power in the computing device.

3. The method as recited in claim 2, the determining which crash dump data to record comprising including in the crash dump data status data from an accelerometer of the computing device.

4. The method as recited in claim 1, the event comprising a high temperature event, and the determining which crash dump data to record comprising including in the crash dump data an indication that the type of event is the high temperature event.

5. The method as recited in claim 1, the determining the crash analysis data comprising using as the crash analysis data only an indication of the type of the event.

6. The method as recited in claim 1, the crash analysis data comprising a fewer number of bytes than the crash dump data.

7. The method as recited in claim 1, further comprising:
   setting, in the reserved memory prior to rebooting the computing device, a flag value indicating that the computing device has been atypically rebooted;

detecting, after rebooting the computing device, that the flag value has been set; and performing the determining the crash analysis data and the communicating the determined crash analysis data in response to detecting that the flag value has been set.

8. The method as recited in claim 7, further comprising:
copying the crash dump data from the reserved memory to a separate portion of a storage device of the computing device; and
clearing the flag value.

9. The method as recited in claim 8, further comprising:
receiving, after communicating the crash analysis data to the remote service, a request from the remote service for the crash dump data; and
communicating, in response to the request, the crash dump data to the remote service.

10. The method as recited in claim 1, the event comprising a user initiated event.

11. A computing device comprising:
nonvolatile memory;
a system on a chip including a processor and firmware, the processor configured to execute the firmware as well as an operating system;
a data write module, included as part of the firmware, configured to detect an event that causes the computing device to be atypically rebooted, the event being one of multiple events that can cause the computing device to be atypically rebooted, to determine, based on the event, which crash dump data to record, and to write the determined crash dump data to a reserved part of the nonvolatile memory;
a reboot system, included as part of the firmware, configured to reboot the computing device in response to the event;
a data analysis module, included as part of the operating system to determine, based on the event and the crash dump data, crash analysis data to send to a remote service; and
a data communication module to communicate the determined crash analysis data to the remote service.

12. The computing device as recited in claim 11, the reserved part of the nonvolatile memory comprising a part of the nonvolatile memory to which the data write module can write crash dump data but other programs on the computing device cannot write data.

13. The computing device as recited in claim 11, the crash analysis data comprising a smaller amount of data than the crash dump data.

14. The computing device as recited in claim 11, further comprising:
the data write module being further configured to set, in the reserved memory prior to the computing device being rebooted by the reboot system, a flag value indicating that the computing device has been atypically rebooted;
a data read module configured to detect, after rebooting the computing device, that the flag value has been set; and the data analysis module being configured to determine the crash analysis data and the data communication module being configured to communicate the determined crash analysis data to the remote service in response to the data read module detecting that the flag value has been set.

15. A computing device comprising:
one or more processors;
firmware including multiple instructions that, responsive to execution by the one or more processors, cause the one or more processors to:
detect an event that causes the computing device to be atypically rebooted,
determine, based on the event, which crash dump data to record,
write the determined crash dump data to reserved memory, and
reboot the computing device; and
an operating system including multiple instructions that, responsive to execution by the one or more processors, cause the one or more processors to:
determine, based on the event and the crash dump data, crash analysis data to send to a remote service, and
communicate the determined crash analysis data to the remote service.

16. The computing device as recited in claim 15, the computing device including nonvolatile memory, the reserved memory comprising a part of the nonvolatile memory to which the firmware can write but the operating system cannot write data.

17. The computing device as recited in claim 15, further comprising the one or more processors, the reserved memory, and the firmware being implemented on a system on a chip of the computing device.

18. The computing device as recited in claim 15, the crash analysis data comprising a fewer number of bytes than the crash dump data.

19. The computing device as recited in claim 15, further comprising:
the firmware, responsive to execution by the one or more processors, further causing the one or more processors to set, in the reserved memory prior to the computing device being rebooted by the reboot system, a flag value indicating that the computing device has been atypically rebooted; and
the operating system, responsive to execution by the one or more processors, further causing the one or more processors to detect, after rebooting the computing device, that the flag value has been set, and determine the crash analysis data and communicate the determined crash analysis data to the remote service in response to the detecting that the flag value has been set.

20. The computing device as recited in claim 15, the event comprising a user initiated event.

* * * * *